(12) United States Patent
Gonzales et al.

(10) Patent No.: US 9,739,138 B2
(45) Date of Patent: Aug. 22, 2017

(54) UP HOLE TRANSMISSION OF WELL DATA BASED ON BANDWIDTH

(71) Applicant: Halliburton Energy Services, Inc., Houston, TX (US)

(72) Inventors: Nestor Javier Gonzales, Houston, TX (US); Robert Norman Wright, Shoreacres, TX (US); Horacio Alberto Zea, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 27 days.

(21) Appl. No.: 14/763,101

(22) PCT Filed: Feb. 12, 2013

(86) PCT No.: PCT/US2013/025740
§ 371 (c)(1),
(2) Date: Jul. 23, 2015

(87) PCT Pub. No.: WO2014/126550
PCT Pub. Date: Aug. 21, 2014

(65) Prior Publication Data
US 2015/0361785 A1    Dec. 17, 2015

(51) Int. Cl.
*E21B 47/12* (2012.01)
*H04B 13/02* (2006.01)
(Continued)

(52) U.S. Cl.
CPC ............ *E21B 47/12* (2013.01); *E21B 47/124* (2013.01); *H04L 47/11* (2013.01);
(Continued)

(58) Field of Classification Search
CPC ....................................................... E21B 47/12
See application file for complete search history.

(56) References Cited

U.S. PATENT DOCUMENTS 4,739,325 A    4/1988  MacLeod
5,682,099 A    10/1997 Thompson et al.
(Continued)

FOREIGN PATENT DOCUMENTS

WO    2011124978 A2    10/2011

OTHER PUBLICATIONS

PCT International Preliminary Report on Patentability, PCT/US2013/025740, dated Aug. 27, 2015, 12 pages.
(Continued)

*Primary Examiner* — Joseph Feild
*Assistant Examiner* — John Mortell
(74) *Attorney, Agent, or Firm* — Alan Bryson; Parker Justiss, P.C.

(57) ABSTRACT

Methods, computer-readable media, and systems for up hole transmission of well data based on bandwidth are described. A down hole type data transmission tool includes an input device to receive data from a well tool. The tool includes a processor to determine that sufficient bandwidth is unavailable to transmit all of the received data up hole to a data receiving device in real time, and, responsively, divide the data into a portion to be transmitted up hole in real time and a remainder to be transmitted later. The remainder can be buffered in a memory and transmitted at a later time, for example, when sufficient bandwidth is available.

18 Claims, 4 Drawing Sheets

(51) Int. Cl.
  *H04W 28/14* (2009.01)
  *H04L 12/805* (2013.01)
  *H04L 12/801* (2013.01)
  *H04L 12/853* (2013.01)
  *H04L 12/823* (2013.01)

(52) U.S. Cl.
  CPC .......... *H04L 47/2416* (2013.01); *H04L 47/32* (2013.01); *H04L 47/365* (2013.01); *H04W 28/14* (2013.01)

(56) References Cited

U.S. PATENT DOCUMENTS

| | | | |
|---|---|---|---|
| 6,657,551 B2 | 12/2003 | Huckaba et al. | |
| 6,750,783 B2 | 6/2004 | Rodney | |
| 7,145,472 B2 | 12/2006 | Lilly et al. | |
| 7,230,542 B2 | 6/2007 | Smits et al. | |
| 7,519,082 B2 | 4/2009 | Quigley et al. | |
| 7,894,302 B2 | 2/2011 | Aiello et al. | |
| 8,044,821 B2 | 10/2011 | Mehta | |
| 8,237,584 B2 | 8/2012 | Hall et al. | |
| 2005/0285751 A1 | 12/2005 | Hall et al. | |
| 2006/0062249 A1 | 3/2006 | Hall et al. | |
| 2006/0256718 A1 | 11/2006 | Hall et al. | |
| 2007/0198192 A1 | 8/2007 | Hsu et al. | |
| 2010/0182161 A1 | 7/2010 | Robbins et al. | |
| 2011/0050452 A1* | 3/2011 | Kusuma | G01V 11/002 340/853.7 |
| 2011/0187553 A1* | 8/2011 | Rodney | E21B 47/122 340/852 |
| 2012/0176138 A1 | 7/2012 | Prammer | |

OTHER PUBLICATIONS

Patent Examination Report No. 1 issued by IP Australia in Australian Application No. 2013378153, dated Jan. 27, 2016.
PCT International Search Report and Written Opinion of the International Searching Authority, PCT/US2013/025740, dated Oct. 18, 2013, 16 pages.

* cited by examiner

UP HOLE TRANSMISSION OF WELL DATA BASED ON BANDWIDTH

CROSS-REFERENCE TO RELATED APPLICATIONS

This application is a U.S. National Phase Application of and claims the benefit of priority to International Application No. PCT/US2013/025740, filed on Feb. 12, 2013, the contents of which are hereby incorporated by reference.

TECHNICAL FIELD

This disclosure relates to data received from a well tool, which is transmitted up hole.

BACKGROUND

Wellbores may be drilled to locate and produce hydrocarbons, minerals, or water. During wellbore operations, for example, drilling operations, communication of data received from down hole type well tools included, for example, in a bottom hole assembly, to up hole data receiving devices can be performed using a telemetry system. In general, the telemetry system can be used to transmit power, data, commands, signals, or combinations of them, between the down hole type well tools and the up hole data receiving devices.

DESCRIPTION OF DRAWINGS

Like reference symbols in the various drawings indicate like elements.

DETAILED DESCRIPTION

This disclosure describes data communication devices that include down hole type data transmission tools to transmit well data to up hole data receiving devices at different times based on bandwidth available for data transmission. In general, a data transmission tool can receive well data from down hole type well tools, for example, tools included in a bottom hole assembly, and transmit the well data up hole to the data receiving devices. Decisions regarding well bore operations are taken based, in part, on the well data received from one or more of the data transmission tools. Consequently, receiving the well data up hole in real time, for example, as soon after the well data is received from the well tools as possible, is beneficial. However, a bandwidth available to transmit the data up hole may be limited. For example, the bandwidth may be affected by the type of telemetry system used in the well bore, a depth of the well bore, processes that the well bore tool implements to obtain well data, frequencies at which well data is received from the well tools, or combinations of them.

The data transmission tool described here can determine a bandwidth to transmit data received from well tools up hole. When the system determines that sufficient bandwidth is unavailable to transmit all of the received data in real time, i.e., as the data is received from the well tool, the tool can divide the data into a portion that can be transmitted in real time and a remainder that can be buffered for transmission at a later time based on bandwidth that is available for data transmission and priorities defined by the data's end user. In some situations, the portion transmitted in real time can include data that is more critical relative to the remainder that is buffered for transmission at the later time. For example, the portion transmitted in real time can previously be identified as data that has a greater effect on the decisions regarding well bore operations than the buffered remainder.

Implementations of the subject matter described here can provide one or more of the following potential advantages. The data transmission tool described here can minimize or overcome bandwidth limitations by transmitting only a portion of the received data and delaying transmission of the remaining data to a later time. Consequently, longer tool strings or complex tools (or both) can be run down hole in the well bore to measure well data. In addition, a number of trips in hole to collect well data can also be decreased.

Figure 1:
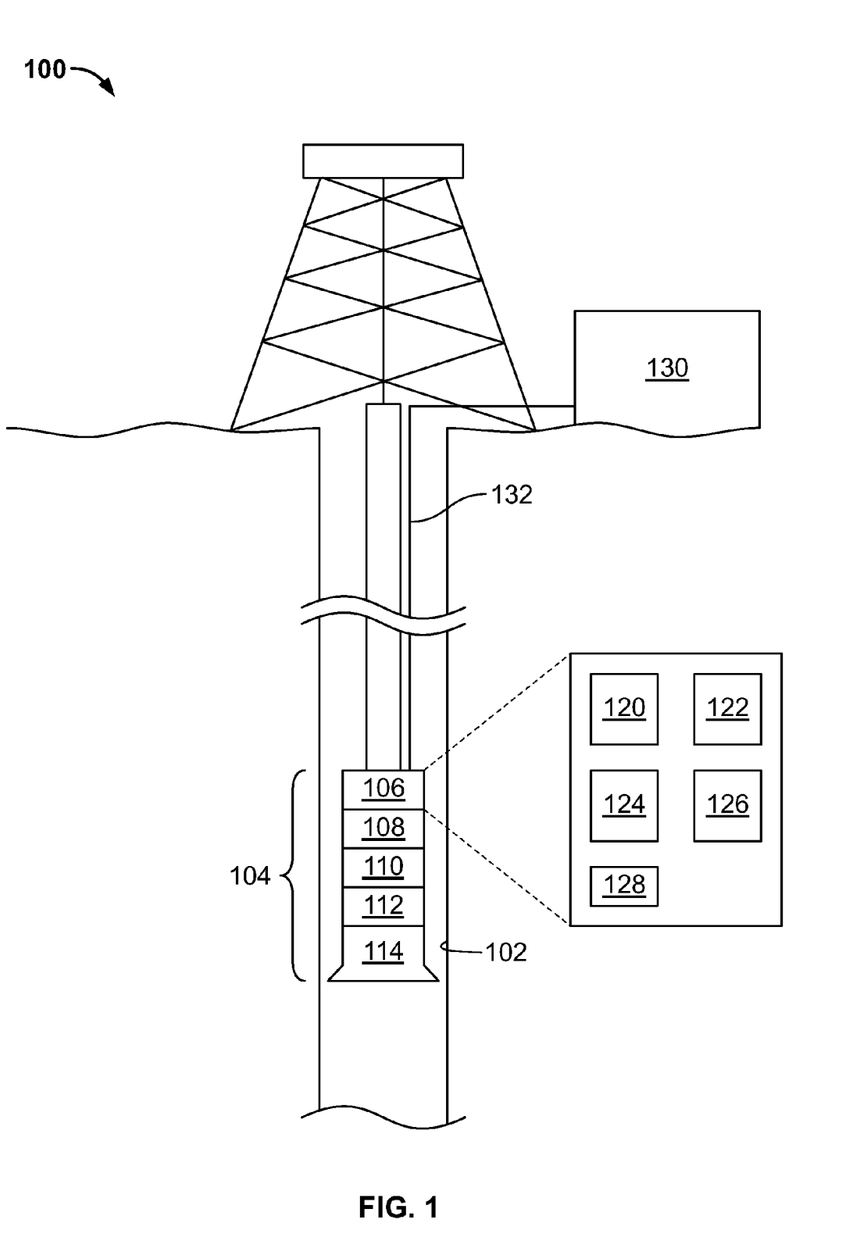
FIG. 1 is an example of a wellbore system that includes a down hole type data transmission tool.

FIG. 1 is an example of a wellbore system 100 that includes a down hole type data transmission tool 106. A well bore 102 can be formed by a drilling process and a bottom hole assembly (BHA) 104 can be lowered into the well bore 102 on a string, for example, a drilling string, a wire line, and the like. The BHA 104 can include (or be adapted to be connected to) a data transmission tool 106 and multiple well tools (for example, a first well tool 108, a second well tool 110, a third well tool 112, a fourth well tool 114, and the like). A well tool can include, for example, an acoustic tool, a nuclear magnetic resonance (NMR) tool, a nuclear tool, a multi-dimensional induction tool, a reservoir description tool, a drilling tool, or the like. In general, a well tool can be any tool used to determine well properties, formation properties, or any data used to make well, drilling or producing decisions. The data transmission tool 106 can transmit well data received from one or more of the multiple well tools to an up hole data receiving device 130 through a data transmission network implemented by a telemetry system such as a mud pulse system, an electromagnetic system, an acoustic system, an optical system, a wired connections 132, or combinations of them. The up hole data receiving device 130 can include a computer system configured to receive, process, and output the well data.

The data transmission tool 106 can include an input device 120 to receive data from one or more of the well tools. The tool 106 can additionally include a processor 122 to divide the data received by the input device 120 into portions to be transmitted at different times based on bandwidth available for data transmission. A portion or portions of the divided data can be buffered, i.e., stored in a computer-readable memory 124, or transmitted using a transmitter 126 (or both). In some implementations, the tool 106 can include a computer-readable medium 128 that stores computer instructions executable by the processor 122 to perform the operations of the data transmission tool 106. For example, the operations performed by the input device 120 and the transmitter 126 can be implemented as computer instructions executable by the processor 122. Alternatively, or in addition, the components of the tool 106 can be implemented as firmware, hardware, or a combination of the two alone or with the computer instructions stored on the computer-readable medium 128 that in operation causes the tool 106 to perform the operations described here.

The input device 120 of the tool 106 can receive data from the well tool 108. The processor 122 of the tool 106 or a surface computer system (or both) can determine that sufficient bandwidth is unavailable to transmit all of the required data up hole to the data receiving device as data is received from the well tool. For example, the processor 122 can do so based on communication negotiations with a surface computer system. In response to determining that sufficient bandwidth is unavailable (for example, as a result of the communication negotiations), the processor 122 can divide the data into a portion of the received data to be transmitted as the portion is received from the well tool 108, and a remainder of the received data to be transmitted at a later time based on the bandwidth available to transmit data up hole to the data receiving device 130. The processor 122 can additionally divide the data based on guidelines provided an up hole computer system, for example, connected to the data receiving device 130. The memory 124 can buffer, i.e., store the remainder of the received data. The transmitter 126 can transmit the portion of the received data up hole to the data receiving device 130 in real time, i.e., as data in the portion is received from the well tool 108, and transmit the remainder of the received data at the later time. In some implementations, the transmitter 126 can transmit the remainder of the received data, for example, when bandwidth becomes available at a later time, after the well tool 108 has stopped obtaining data, when the well tool (or the tool 106) is being raised up hole, after the tool has returned to the surface, or combinations of them. In this manner, the tool 106 can transmit data received from the well tool 108 at different times based on available bandwidth or later on the surface via a direct communications link. Using a time stamp and a depth stamp included in the data, the data receiving device 130 can compile all the data received from the well tool 108. To do so, for example, the data receiving device 130 can correlate the time stamp included in the data with a time stamp of an up hole depth measurement.

In some implementations, the tool 106 can perform the afore-described operations for each of the well tool 110, the well tool 112, and the well tool 114 at respective different times. Alternatively, the tool 106 can perform the afore-described operations for certain targeted well tools in the BHA 104. In other words, the tool 106 can transmit portions of data received from the targeted well tools in real time and buffer remainders of the data received from the targeted well tools for transmission or retrieval at a later time. Well tools can be targeted based on factors including a criticality of the data received from a targeted well tool. Data from a well tool can be critical if the data enables an operator determine a status of the tool, for example, whether the tool is broken or not. For well tools configured to perform computations (for example, sonic tools), some initial data, for example, data that enables determining a first approximation of the required answer (i.e., formation slowness or $\Delta t$) can be more critical than subsequently obtained data, for example, data used to determine the complete answer (in this example, the use of the complete acoustical wave forms to determine fractures and other formation characteristics) For the well tools not targeted, the tool 106 can either transmit all of the received data in real time or buffer all of the received data for transmission at a later time.

Figure 2:
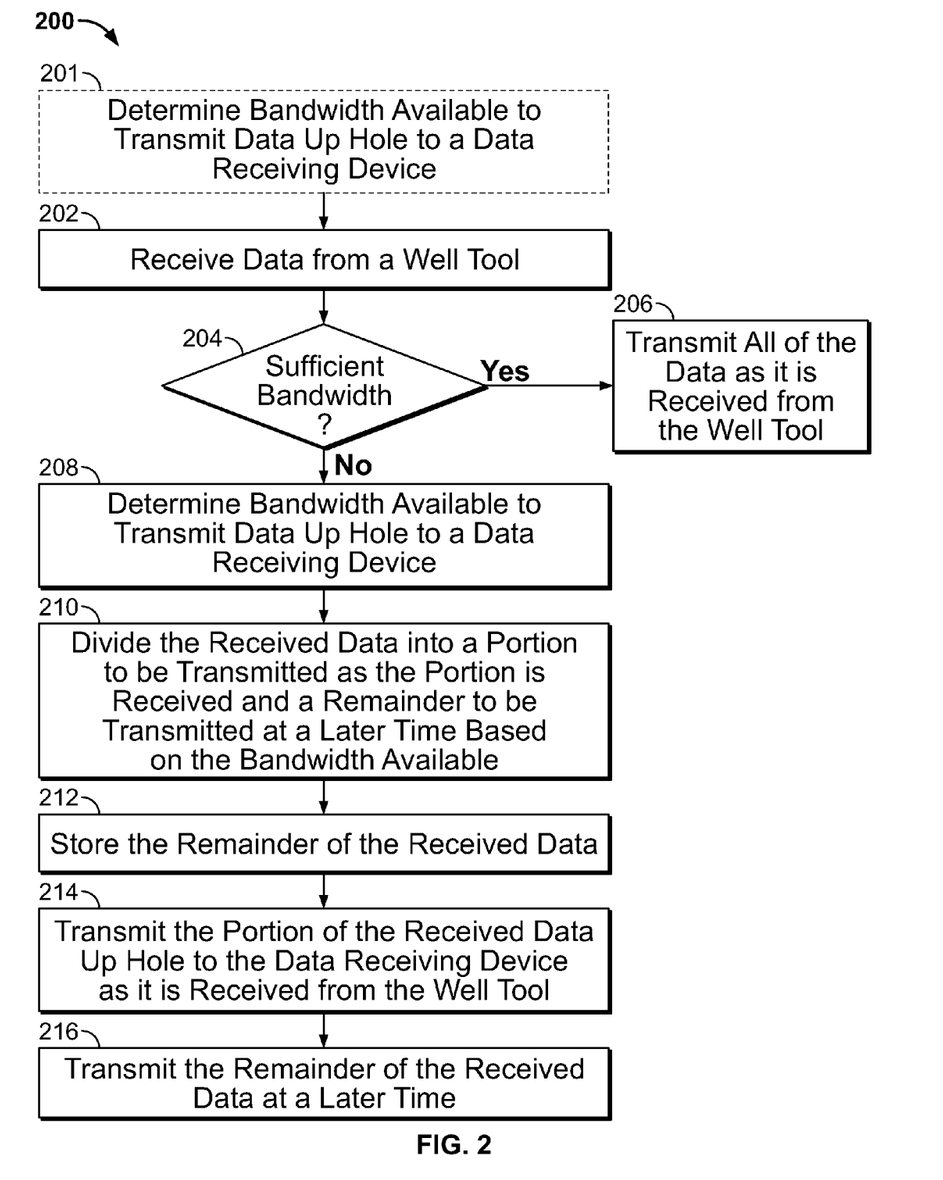
FIG. 2 is a flowchart of an example process for transmitting well data up hole based on bandwidth.

FIG. 2 is a flowchart of an example process 200 for transmitting well data up hole based on bandwidth. The process 200 can be implemented by the data transmission tool 106, and, more specifically, by the processor 122 in the tool 106 to receive data collected by a well tool, buffer the received data, and transmit the data up hole based on available bandwidth. At 202, the tool 106 can receive data from the well tool (for example, one of the well tools 108, 110, 112, 114, or combinations of them). Each well tool can transmit respective data to the tool 106 at a respective frequency. Alternatively, or in addition, each well tool can transmit different volumes of data to the tool 106 at different times, for example, because the well tool is configured to obtain or process and send different data at different times. Thus, volumes of data that the tool 106 receives can be different at different time instances. Because the tool 106 receives varying volumes of data at different times and based on factors such as the data transmission system used, parameters of the well bore 102, and the like, data transmission loads on a telemetry system that transmits the data up hole from the tool 106 can also be different at different times.

At 204, the tool 106 can determine if sufficient bandwidth is available to transmit all of the received data up hole, for example, to the data receiving device 130, in real time. Transmitting data in real time can include transmitting the data as soon as the data is received or as soon after the data is received as possible. Thus, in real time data transmission, the tool 1006 transmits the data immediately after the tool 106 receives the data from the well tool. Alternatively, in real time data transmission, a time between receiving data at the tool 106 and transmitting the received data up hole is negligible. In some situations, sufficient bandwidth may be available to transmit all of the received data up hole in real time. Thus, if the system determines that sufficient bandwidth is available (decision branch "YES"), then, at 206, the tool 106 can transmit all of the data as it is received from the well tool, i.e., in real time.

However, due to the varying transmission load, sufficient bandwidth may not be available to transmit all of the received data in real time. Thus, if the system determines that sufficient bandwidth is not available to transmit all the data up hole in real time (decision branch "NO"), then, at 208, the system can determine the bandwidth available to transmit data up hole to the data receiving device 130. The total bandwidth can be determined at connection time by a data transport hardware resident on both the device 130 and tool 106. Subsequently, the network protocol can periodically determine the bandwidth available. In some implementations, the system can determine the bandwidth available to transmit data up hole at 201, i.e., before receiving data from the well tool. As described above, the available bandwidth can depend on one or more factors including the data transmission systems implemented in the well bore system 100, parameters of the well bore 102 (for example, a depth of the well bore 102), the operations of the well tools (for example, a frequency at which each well tool provides data to the tool 106), or combinations of them.

In response to determining that sufficient bandwidth is unavailable, at 210, the tool 106 can divide the received data into a portion to be transmitted as the portion is received and a remainder to be transmitted at a later time based on a bandwidth available to transmit data up hole to the data receiving device 130. At 212, the tool 106 can store the remainder of the received data, for example, by buffering the remainder in the memory 124. The tool 106 can transmit the portion of the received data up hole in real time at 214, and transmit the remainder of the received data at a later time at 216.

Because the division of the received data into the portion to be transmitted in real time and the remainder to be transmitted at the later time depends on the available bandwidth and because the available bandwidth may vary with time, the system can periodically execute step 208 to determine the available bandwidth at different time instants. For example, the bandwidth available to transmit the received data at a second time instant can be more than the bandwidth available at a first, prior time instant. By determining available bandwidths at the first and second time instants, the tool 106 can transmit more of the received data in real time in the second time instant than the first time instant.

Figure 3:
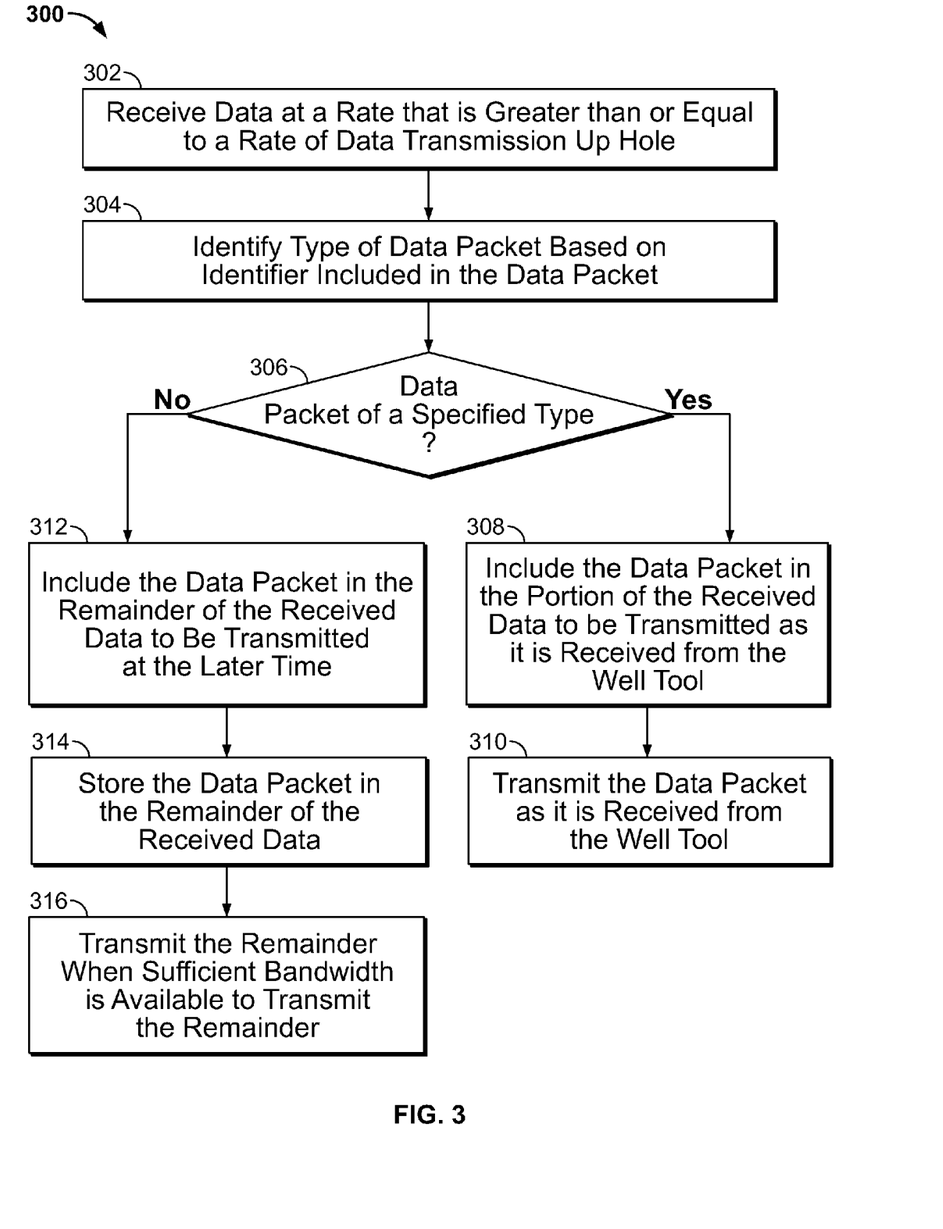
FIG. 3 is a flowchart of an example process for identifying a portion of data to be transmitted as the portion is received and a remainder to be transmitted at a later time.

FIG. 3 is a flowchart of an example process 300 for identifying a portion of data to be transmitted as the portion is received and a remainder to be transmitted at a later time. The process 300 can be implemented by a data transmission tool, for example, the tool 106, and more specifically, by the processor 122 included in the tool 106. At 302, the tool 106 can receive data (i.e., well data) at a rate that is greater than or equal to a rate of data transmission up hole. For example, the tool 106 can determine that the rate at which data is received from the well tool is greater than an available bandwidth to transmit all the received data up hole as the data is received from the well tool. In response, the tool 106 can divide the received data into a portion to be transmitted up hole in real time and a remainder to be transmitted at a later time as described above based, at least in part, on a type of the data.

The well tool can transmit well data to the tool 106 as multiple data packets. In each packet, the well tool can include a respective identifier that identifies a type of data in the data packet. These data packets can have previously been defined by the tool and transmitted to the tool 106 and the data receiving device 130 during initialization (or upon request or both) in a pre-determined format such as Extensible Markup Language (XML). In this manner, the well tool can configure the well data to be self-describing. The tool 106 can thus receive the multiple data packets that collectively represent the well data as multiple XML files, each of which describes the type of data in the file. For each data packet, the tool 106 can identify a type a data packet based on an identifier in the data packet at 304.

The tool 106 can determine that a data packet is to be included in the portion of the received data to be transmitted and that a data packet that is not of the specified type is to be included in the remainder that is to be buffered for later transmission. Thus, at 306, the tool 106 can determine whether a data packet is of a specified type based, at least in part, on an identifier in the data packet. If the tool 106 determines that the data packet is of the specified type (decision branch "YES"), then, at 308, the tool 106 can include the data packet in the portion of the received data to be transmitted as it is received from the well tool, and, at 310, transmit the data packet up hole in real time. If, on the other hand, the tool 106 determines that the data packet is not of the specified type (decision branch "NO"), then, at 312, the tool 106 can include the data packet in the remainder to be transmitted at the later time. At 314, the tool 106 can buffer, i.e., store the data packet, and, at 316, transmit the data packet (and other data packets in the remainder) when sufficient bandwidth is available to transmit the remainder. In alternative or additional implementations, the tool 106 can be configured to include packets of a specified type in the remainder of the data to be buffered for transmission at a later time based on available bandwidth.

In some implementations, the tool 106 can transmit all the data included in a data packet either in real time or at the later time. Alternatively, the tool 106 can transmit a portion of data included in a data packet in real time while buffering the remainder of the data included in the data packet for later transmission. For example, based on an identifier included in a data packet or a size of the data packet (or both), the tool 106 can determine that a data packet is a high density (HD) packet that includes data that is more voluminous than data included in a standard density packet. A portion of data in an HD packet can be identified as being data of a specified type, for example, as critical data. The tool 106 can be configured to buffer the HD packet and to transmit the portion of the HD packet identified being of the specified type in real time. The tool 106 can transmit the remainder of the HD packet at a later time. In this manner, the tool 106 can prioritize the transmission of portions of data included in all or portions of data packets based, in part, on a criticality of the data.

Figure 4:
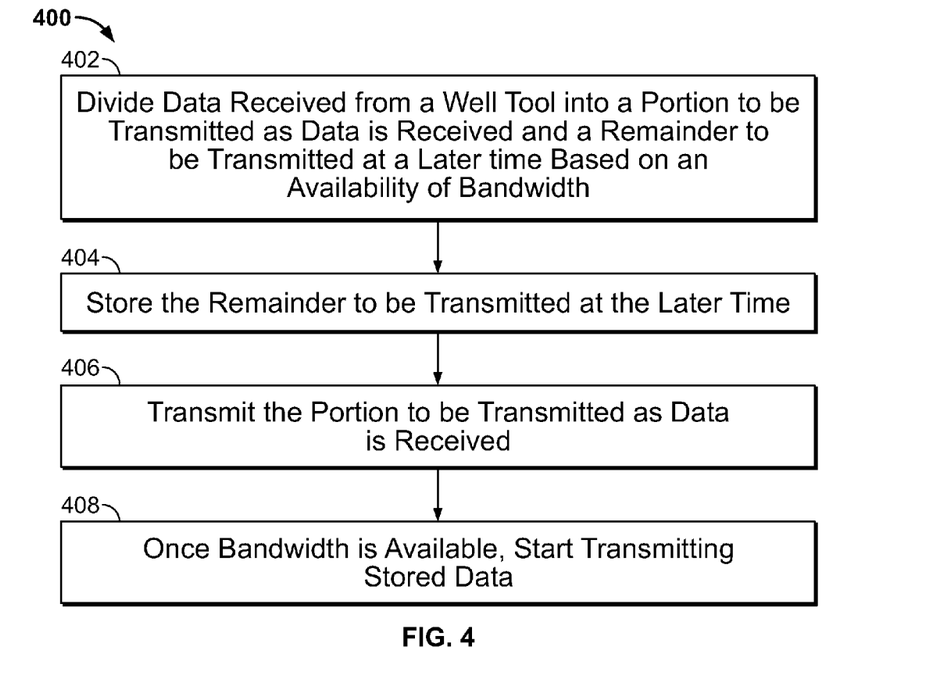
FIG. 4 is a flowchart of an example process implemented by a down hole type data transmission tool.

FIG. 4 is a flowchart of an example process 400 implemented by a down hole type data transmission tool. The process 400 can be implemented by a data transmission tool, for example, tool 106. The tool 106 can include a memory 124 to divide data received from a well tool, for example, well tool 114, into a portion to be transmitted as data is received and a remainder to be transmitted at a later time based on an availability of bandwidth to transfer data up hole to a data receiving device at 402. The memory 124 can store the remainder to be transmitted at the later time at 404. The tool 106 can include a transmitter 126 to transmit the portion to be transmitted as data is received, i.e., in real time, at 406. Once bandwidth becomes available, then, at 408, transmission of stored data can begin.

Figure 5:
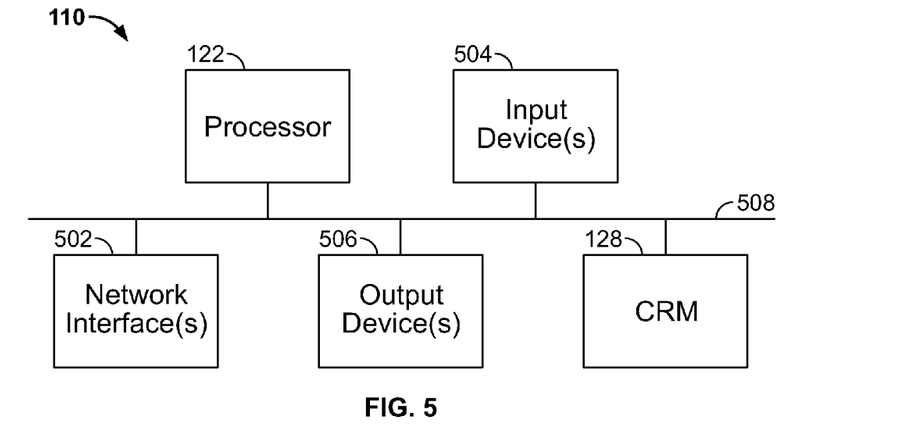
FIG. 5 is an example of an architecture of the computer system of FIG. 1.

FIG. 5 is an example of an architecture of the computer system of FIG. 1. The computer system includes one or more processors 122 and a computer-readable medium 128 storing computer instructions executable by the one or more processors 122 to transmit well data up hole based on bandwidth. The computer system can include one or more network interfaces 502 and one or more input devices 504, for example, the input device 120, and the like. The computer system can also include one or more output devices 506, for example, the transmitter 122, and the like. The components of the computer system can be coupled by a bus 508.

A number of embodiments have been described. Nevertheless, it will be understood that various modifications may be made without departing from the spirit and scope of the invention. For example, the data transmission tool can receive from one or multiple well tools (for example, well tools 108, 110, 112, and 114) at a collective rate that is greater than or equal to a rate of data transmission up hole to the data receiving device 130.

What is claimed is:

1. A down hole type data transmission tool adapted to couple to a well tool, the down hole type data transmission tool comprising:
   an input device to receive data from the well tool;
   a processor to:
      determine that sufficient bandwidth is unavailable to transmit all of the received data up hole to a data receiving device as data is received from the well tool, and
      in response to determining that sufficient bandwidth is unavailable, divide the received data into a first portion to be transmitted as the first portion is received from the well tool and into a second portion of the same received data to be transmitted at a later time based on a bandwidth available to transmit data up hole to the data receiving device, wherein the processor determines that the first portion of the received data to be transmitted is of a specified type and that the second portion of the same received data is not data of the specified type;

a memory to store the second portion of the same received data;

a transmitter to:
transmit the first portion of the received data up hole to the data receiving device as data in the portion is received from the well tool, and
transmit the second portion of the same received data at the later time.

2. The tool of claim 1, wherein the processor causes the transmitter to continue to transmit the second portion of the same received data at the later time after the well tool has stopped obtaining data.

3. The tool of claim 1, wherein the processor causes the transmitter to transmit the second portion of the same received data at the later time in response to determining that sufficient bandwidth is available to transmit the stored second portion of the same received data up hole to the data receiving device.

4. The tool of claim 1, wherein the later time is a time when the well tool is being raised up hole.

5. The tool of claim 1, wherein the input device receives the data as a plurality of data packets, each data packet including a respective identifier that identifies a type of data in the data packet.

6. The tool of claim 5, wherein the processor includes a data packet including data of the specified type in the first portion of the received data to be transmitted and includes a data packet including data not of the specified type in the second portion of the same received data.

7. The tool of claim 1, wherein the well tool is at least one of an acoustic tool, a nuclear magnetic resonance (NMR) tool, a nuclear tool, a multi-dimensional induction tool, or a reservoir description tool.

8. A method for transmitting data obtained from a well, the method comprising:
receiving data from a well tool;
determining that insufficient bandwidth is available to transmit all of the received data up hole to a data receiving device as data is received from the well tool;
in response to determining that sufficient bandwidth is unavailable, dividing the data into a first portion of the received data to be transmitted as the portion is received from the well tool and into a second portion of the same received data to be transmitted at a later time based on a bandwidth available to transmit data up hole to the data receiving, device
determining that the first portion of the received data to be transmitted is data of a specified type and that the second portion of the same received data is not of the specified type;
storing the second portion of the same received data in a computer-readable memory;
transmitting the first portion of the received data up hole to the data receiving device as data included in the portion is received from the well tool; and
transmitting the second portion of the same received data at a later time.

9. The method of claim 8, wherein receiving the data comprises receiving a plurality of data packets that collectively represent the data, each data packet including a respective identifier that identifies a type of data in the data packet.

10. The method of claim 8, further comprising:
including a data packet that includes data of the specified type in the first portion of the received data to be transmitted; and
including a data packet that includes data not of the specified type in the second portion of the same received data.

11. The method of claim 9, further comprising transmitting the second portion of the same received data at the later time when sufficient bandwidth is available to transmit the stored second portion of the same received data at the later time.

12. The method of claim 9, further comprising transmitting the second portion of the same received data at the later time after the well tool has ceased obtaining data.

13. The method of claim 9, further comprising transmitting the second portion of the same received data at the later time when the well tool is being raised up hole at the later time.

14. The method of claim 9, wherein the well tool is at least one of an acoustic tool, a nuclear magnetic resonance (NMR) tool, a multi-dimensional induction tool, or a reservoir description tool.

15. The method of claim 9, wherein receiving the data comprises receiving the data at a rate that, is greater than or equal to a rate of data transmission up hole to the data receiving device.

16. The method of claim 9, wherein receiving the data comprises receiving the data from a plurality of well tools at a collective rate that is greater than or equal to a rate of data transmission up hole to the data receiving device.

17. A down hole type data transmission tool adapted to couple to a well tool, the down hole type data transmission tool comprising:
a memory to:
divide data received from a well tool into a first portion of the received data to be transmitted as data is received and into a second portion of the same received data to be transmitted at a later time based on an availability of bandwidth to transfer data up hole to a data receiving device based on a determination of bandwidth, wherein the first portion of the received data to be transmitted is of a specified type and that the second portion of the same received data is not data of the specified type, and
store the second portion of the received data to be transmitted at the later time; and
a transmitter to transmit the first portion to be transmitted as data is received.

18. The tool of claim 17, wherein the memory includes a processor that divides the received data into the second portion of the received data to be stored in response to determining that sufficient bandwidth is unavailable fore the transmitter to transmit all of the received data up hole to the data receiving device in real time.

* * * * *

UNITED STATES PATENT AND TRADEMARK OFFICE
CERTIFICATE OF CORRECTION

PATENT NO. : 9,739,138 B2
APPLICATION NO. : 14/763101
DATED : August 22, 2017
INVENTOR(S) : Nestor Javier Gonzales et al.

It is certified that error appears in the above-identified patent and that said Letters Patent is hereby corrected as shown below:

In the Claims

In Column 7, Line 48, after "to the data" delete "receiving," and please insert --receiving--

In Column 8, Line 29, after "at a rate" delete "that," and please insert --that--

In Column 8, Line 57, after "is unavailable" delete "fore" and please insert --for--

Signed and Sealed this
Twentieth Day of February, 2018

Andrei Iancu
*Director of the United States Patent and Trademark Office*